United States Patent [19]
Nagy et al.

[11] Patent Number: 4,681,531
[45] Date of Patent: Jul. 21, 1987

[54] PROCESS AND EQUIPMENT FOR THE THERMIC CONVERSION OF THE COMPONENTS OF GAS CURRENTS CONTAMINATING THE ENVIRONMENT

[75] Inventors: Zoltán Nagy, Budapest; György Hupka, Veszprém; Ottó Szalay, Veszprém; Attila Kovács, Veszprém, all of Hungary

[73] Assignee: Magyar Asvanyolaj es Foldgaz Kiserleti, Veszprem, Hungary

[21] Appl. No.: 648,535

[22] Filed: Sep. 7, 1984

[30] Foreign Application Priority Data

Sep. 23, 1983 [HU] Hungary ............................ 3294

[51] Int. Cl.$^4$ ............................................ F23C 5/08
[52] U.S. Cl. .................................... 431/181; 431/10; 431/187; 110/313
[58] Field of Search ............ 431/5, 10, 116, 115, 431/181, 187; 110/188, 187, 313, 210–213; 423/210 C, 245, 246; 422/182, 183

[56] References Cited

U.S. PATENT DOCUMENTS

| | | | |
|---|---|---|---|
| 4,036,580 | 7/1977 | Reed et al. | 431/5 X |
| 4,316,420 | 2/1982 | Kochey | 110/187 X |
| 4,373,902 | 2/1983 | Reed et al. | 431/5 X |
| 4,483,832 | 11/1984 | Schirmen | 431/5 X |

Primary Examiner—Larry Jones
Attorney, Agent, or Firm—Schweitzer & Cornman

[57] ABSTRACT

A process for thermally converting components of gas currents contaminating the environment and equipment for performing the process. Combustion serving for the primary heat production is performed in the gas current to be converted thermically and in a plurality of places in proper distribution. In such a manner, gas currents next to the flames produced in the course of combustion are heated to high temperatures and by utilizing the secondary heat quantity arising in the course of the thermic conversion taking place quickly in the vicinity of the flames, the process of thermal conversion is further accelerated.

4 Claims, 3 Drawing Figures

PROCESS AND EQUIPMENT FOR THE THERMIC CONVERSION OF THE COMPONENTS OF GAS CURRENTS CONTAMINATING THE ENVIRONMENT

The invention relates to a process for the thermic conversion of the components of gas currents contaminating the environment, to the realization of combustion needed for the process as well as to the equipment for performing the process according to the invention.

In industrial practices gas currents containing combustible components harmful to the environment often arise. In order to protect the environment these contaminant components must be converted into substances which are not harmful. One frequently used method of the removal of harmful material is thermic conversion. Dissipation heat transfer used to be effected in the majority of cases by mixing combustion products resulting from the combustion of combustible gases or liquids with the contaminated gas. Dissipation heat transfer considerably influences the efficiency and economy of the process.

In general, contaminating components to be converted thermically are present in small concentrations in gas currents of high volume. The gas current has to be mixed with a large quantity of combustion product in a very short time; otherwise, harmful substances traveling in colder zones will be only partly converted or not converted at all.

In the course of known thermic processes, combustion products are produced by means of gas- or oil burners installed at the proper place in the reactor and the gas current containing contaminating components is admixed with the combustion products transversely or tangentially through expediently positioned apertures (Gas-Warme International 26, 6/7 pp. 294-197/1977). In order to accelerate admixture, flow velocities are considerably increased involving enormous energy input and often noise. In spite of said endeavors, in larger equipment, the process of resolution is often protracted in space and time, and at the same time, harmful substances are not converted to the required extent.

The invention relates to a continuously operating process for the conversion of gas currents containing environment contaminating components. Thermic conversion is realized by utilizing the heat content of the combustion products arising in the course of combustion of combustible gases, vapours or liquids.

In accordance with our process, combustion serving for primary heat production is performed in the gas current to be converted thermically, optionally preheated, and in a plurality of places in proper distribution. In such a manner gas currents next to the flames produced in the course of combustion are heated to high temperatures and by utilizing the secondary heat quantity arising in the course of the thermic conversion taking place quickly in the vicinity of the flames, the process of thermal conversion is further accelerated.

In the process of the invention, it is considered as advantageous, if material currents—or any of them—taking part in thermic resolution are pre-heated. Under the influence of a pre-heating quantity of fuel, the quantity of air as well as the quantity of gas discharged from the process of resolution can be decreased. Expediently, the heat content of warm gases leaving the thermic resolution process is utilized for pre-heating.

For the thermic conversion of harmful substances contained in gas currents poor in oxygen—as a consequence of the decrease in the gas quantity taking part in the process as well as a decreased heat requirement—air with an increased oxygen content or oxygen can be economically applied.

Compared to known processes, the advantage of the process according to the invention lies in that instead of an independent flame space of high temperature, flames burning in the entering cross-section of the gas current to be converted thermally are used. As a consequence, temperature gradients perpendicular to the direction of flow will be formed. The resulting quick temperature rise—propagating perpendicularly to the direction of flow—initiates thermic conversion in a short portion which is accelerated in proportion to the speed of secondary heat production. Due to these complex influences, the circumstances of thermic conversion are improved in the following manner:

conversion takes place in a smaller volume, at a higher temperature—the more, in some cases it can be even improved—when introducing identical auxiliary energy;

in the same volume, proper conversion can be obtained by using less auxiliary energy.

One of the embodiments of the equipment for realizing the process according to the invention is to be seen in FIGS. 1 and 2. Several other forms of realization in the scope of the process claims are possible.

Figure 1:
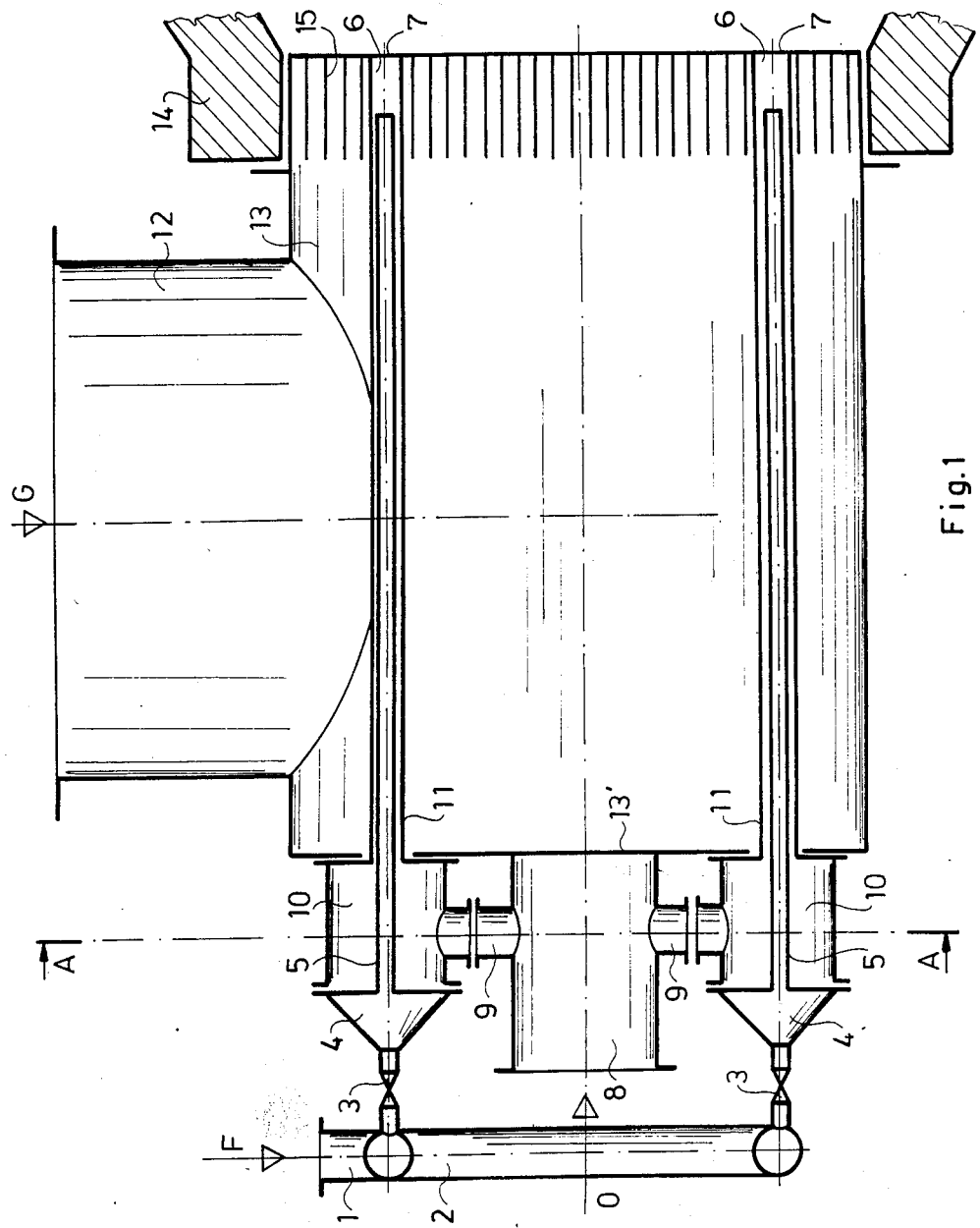
FIG. 1 shows a longitudinal section of the equipment.
Figure 2:
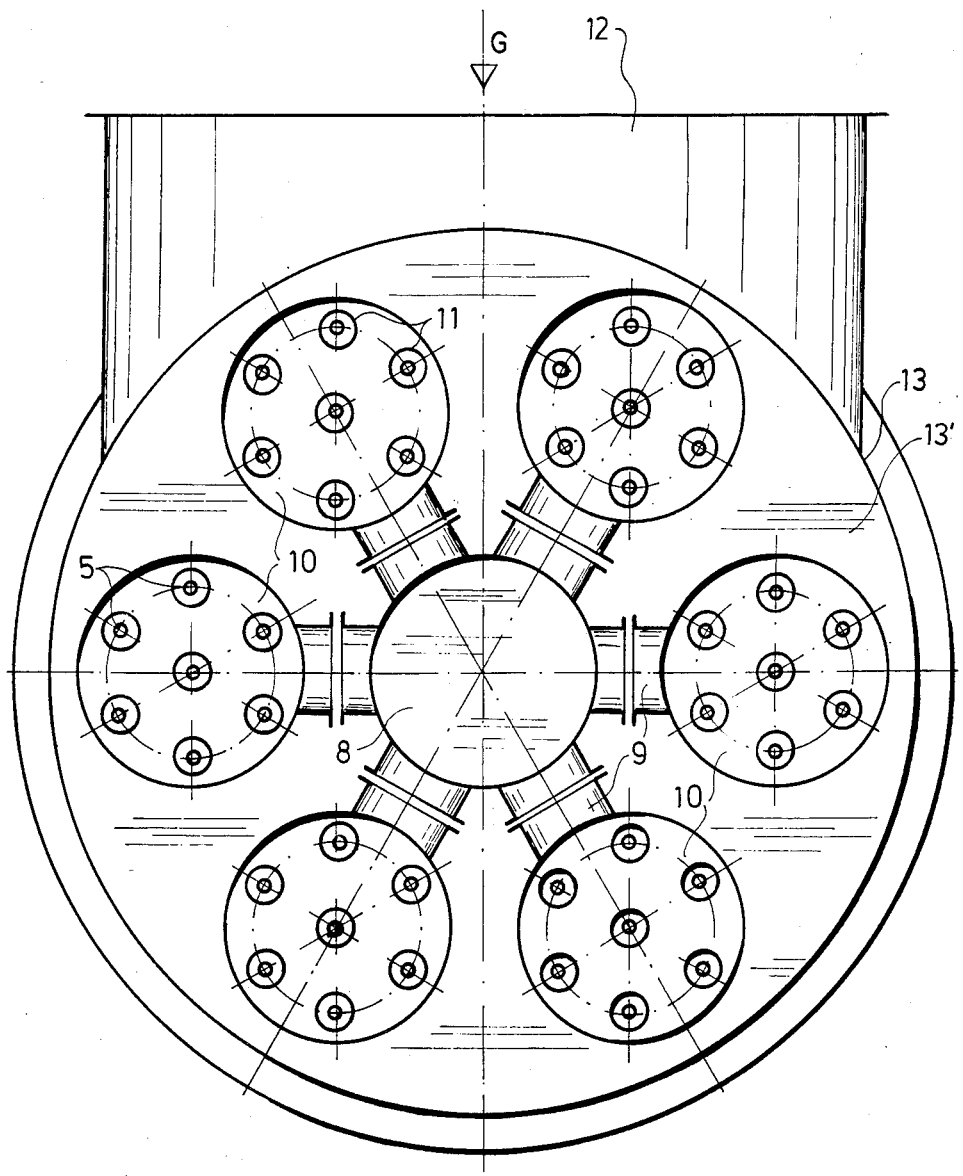
FIG. 2 is a cross-sectional view of the equipment taken along the plane A—A of FIG. 1.

Heating medium F arrives through pipeline 1, ring duct 2, valves 3, distributing chambers 4 and pipes 5 and mixes with the oxidizing gas 0 in mixing spaces 6—at mouth 7 of the burners. Oxidizing gas 0 streams through distributing chamber 8, pipeline 9, distributing chambers 10 and pipes 11 and it is mixed with the heating medium F in mixing spaces 6; the mixture thus obtained is ignited at mouth 7 of the burners, resulting in 6×7=42 flames. The gas G to be converted thermically is led through connecting stud 12 into chamber 13, and therefrom it streams parallel with the flames into resolving space 14. In the environment of the flames the gas stream is rapidly heated and thermic conversion is started in a short time and advances simultaneously in the transverse and longitudinal directions at the beginning of the process.

Figure 3:
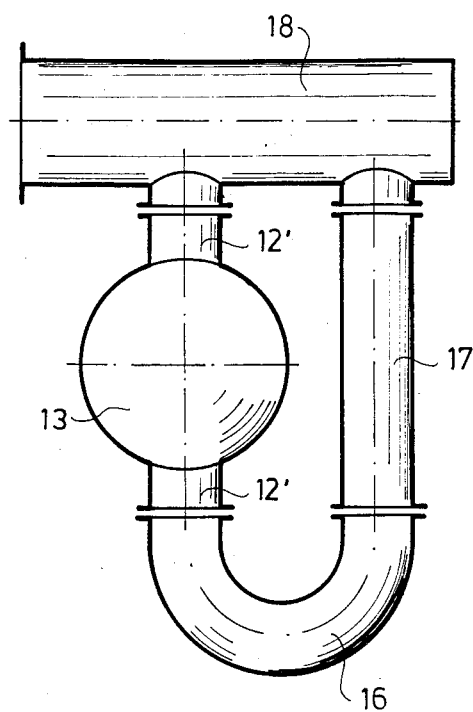
FIG. 3 illustrates an expedient arrangement for introducing the gas current to be converted thermically.

In order to distribute equally gas current G in space 13, it is advantageous to apply current guiding elements 15 or the solution sketched in FIG. 3.

As can be seen in FIG. 3, gas current G enters through connecting studs 12 and pipe tracts 16, 17, 18 into the thermic process.

EXAMPLE

In the experimental equipment we convert 650 $m^3_n$/h of a CO-containing gas having the following input characteristics:

| Temperature Composition: | 540° C. |
| --- | --- |
| CO | 5.1 vol. % |
| $CO_2$ | 9.7 vol. % |
| $H_2O$ | 4.1 vol. % |

-continued

| Temperature Composition: | 540° C. |
|---|---|
| O$_2$ | 5.2 vol. % |
| N$_2$ | 75.9 vol. % |

The gas is led into the resolving space with a velocity of 17 m/s, through a pipe φ210 mm, meanwhile through six concentrically arranged pipe-pairs disposed parallel to the gas current 3.1 m$^3{}_n$/h methane and 31 m$^3{}_n$/h preheated air are delivered and the mixture thereof is subject to combustion at the six outlet mouth. The temperature of the gas leaving the resolving space after a dwelling time of 0.8 sec is 1035° C. and the maximal CO-content amounts to 0.018 vol.%

What we claim is:

1. An apparatus for the thermic conversion of contaminants of a gas stream, which comprises:
   (a) an inlet chamber,
   (b) a resolving chamber axially aligned with, in fluid communication with and connected to one end of said inlet chamber,
   (c) a contaminant-laden gas inlet stud means in fluid communication with said inlet chamber, for delivering a contaminant-laden gas whereby said contaminant-laden gas will flow in parallel to the axis of said inlet chamber from said inlet chamber to said resolving chamber,
   (d) a bottom plate for closing the other end of said inlet chamber opposite the one end thereof connected to said resolving chamber,
   (e) means for delivering an oxidizing gas and a heating medium to the end of the inlet chamber connected to said resolving chamber including a plurality of pairs of co-axially arranged pipe elements uniformly distributed throughout said inlet chamber,
   (f) each of said pairs of co-axially arranged pipe elements being arranged parallel to the axis of said inlet chamber,
   (g) one of said pipe elements of each of said pairs of co-axially arranged pipe elements being arranged to transport and deliver said oxidizing gas to the end of the inlet chamber connected to said resolving chamber,
   (h) the other of said pipe elements of each of said pairs of co-axially arranged pipe elements being arranged to transport and deliver said heating medium to the end of the inlet chamber connected to said resolving chamber,
   (i) each of the pipe elements of each of said pairs of co-axially arranged pipe elements being arranged and configured relative to one another to define a mixing space closely adjacent to the end of the inlet chamber connected to said resolving chamber whereby said oxidizing gas is mixed with said heating medium,
   (j) the end of each of said pairs of co-axially arranged pipe elements defining a burner immediately adjacent said resolving chamber for burning said mixed oxidizing gas and heating medium whereby said burners provide a plurality of uniformly distributed combustion flames at the connection of said inlet chamber and said resolving chamber,
   (k) whereby said contaminant-laden gas flows parallel to the axis of the inlet chamber through said uniformly distributed flames from the inlet chamber to said resolving chamber, whereby said contaminant-laden gas is subjected to an accelerated and optimally highly elevated temperature combustion.

2. The apparatus according to claim 1, further characterized by
   (a) an oxidizing gas manifold means connected to each of said one of said pipe elements arranged to transport and deliver said oxidizing gas to the end of the inlet chamber connected to the end of said resolving chamber, and
   (b) heating medium manifold means connected to each of the other of said pipe elements arranged to transport and deliver said heating medium to the end of the inlet chamber connected to said resolving chamber.

3. The apparatus according to claim 1, further characterized by a flow-equalizer grate means having a series of gas current guiding vanes disposed at the end of the inlet chamber connected to said resolving chamber and arranged immediately adjacent said resolving chamber.

4. The apparatus according to claim 1, further characterized by said contaminant-laden stud means including a plurality of studs in fluid communication with said inlet chamber.

* * * * *